US010739265B2

(12) United States Patent
Kato

(10) Patent No.: US 10,739,265 B2
(45) Date of Patent: Aug. 11, 2020

(54) SOLUTION ATTACHMENT DEVICE AND SOLUTION ATTACHMENT METHOD

(71) Applicant: FUJIFILM Corporation, Tokyo (JP)

(72) Inventor: Kota Kato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 204 days.

(21) Appl. No.: 15/984,443

(22) Filed: May 21, 2018

(65) Prior Publication Data
US 2018/0266955 A1 Sep. 20, 2018

Related U.S. Application Data

(63) Continuation of application No. PCT/JP2016/083148, filed on Nov. 9, 2016.

(30) Foreign Application Priority Data

Nov. 26, 2015 (JP) ................... 2015-230845

(51) Int. Cl.
G01N 21/01 (2006.01)
G01N 35/00 (2006.01)
(Continued)

(52) U.S. Cl.
CPC .......... G01N 21/648 (2013.01); B01L 3/0262 (2013.01); G01N 1/2813 (2013.01);
(Continued)

(58) Field of Classification Search
CPC ..... G01N 2001/2826; G01N 2001/002; G01N 21/648; G01N 1/2813; G01N 21/01;
(Continued)

(56) References Cited

U.S. PATENT DOCUMENTS 6,511,849 B1 * 1/2003 Wang ................... B01J 19/0046
436/47
6,740,530 B1 * 5/2004 Bruce .................. B01J 19/0046
347/40
(Continued)

FOREIGN PATENT DOCUMENTS

CN 1949079 4/2007
CN 101367070 11/2011
(Continued)

OTHER PUBLICATIONS

"International Search Report (Form PCT/ISA/210) of PCT/JP2016/083148," dated Feb. 7, 2017, with English translation thereof, pp. 1-3.

(Continued)

Primary Examiner — Brian J. Sines
(74) Attorney, Agent, or Firm — JCIPRNET

(57) ABSTRACT

A solution attachment device includes: an ejection tool having an ejection opening that ejects a solution in a direction of gravitational force; and a solution attachment control portion for controlling attachment of the solution ejected from the ejection opening to at least one attachment subject region of the solution formed on a substrate in a state in which the at least one attachment subject region is disposed below an end surface including the ejection opening of the ejection tool in the direction of gravitational force, and, in the state, a first projection region obtained by projecting the end surface to a surface perpendicular to the direction of gravitational force substantially overlaps a second projection region obtained by projecting the at least one attachment subject region to the surface.

20 Claims, 7 Drawing Sheets

(51) Int. Cl.
*G01N 33/48* (2006.01)
*G01N 1/00* (2006.01)
*G01N 1/10* (2006.01)
*G01N 21/64* (2006.01)
*G01N 1/28* (2006.01)
*B01L 3/02* (2006.01)
*G01N 21/552* (2014.01)
*G01N 35/10* (2006.01)
*B01L 3/00* (2006.01)

(52) U.S. Cl.
CPC .......... *G01N 21/01* (2013.01); *G01N 21/554* (2013.01); *B01L 3/5088* (2013.01); *B01L 2300/0654* (2013.01); *B01L 2300/0819* (2013.01); *B01L 2300/168* (2013.01); *G01N 35/1065* (2013.01); *G01N 2001/2826* (2013.01)

(58) Field of Classification Search
CPC .. G01N 21/554; G01N 35/1065; G01N 35/00; G01N 33/48; G01N 1/00; G01N 1/10; B01L 3/0262; B01L 3/5088; B01L 2300/0654; B01L 2300/0819; B01L 2300/168
See application file for complete search history.

(56) References Cited

U.S. PATENT DOCUMENTS

| | | | |
|---|---|---|---|
| 2002/0078768 A1* | 6/2002 | Hiatt | B26D 7/1836 73/864.41 |
| 2002/0171037 A1* | 11/2002 | Ellson | G01N 33/54393 250/288 |
| 2005/0121537 A1* | 6/2005 | Ellson | G01N 33/54393 239/102.2 |
| 2010/0156970 A1 | 6/2010 | Ikushima | |
| 2011/0312851 A1* | 12/2011 | Silverbrook | B01L 3/5027 506/40 |
| 2012/0251999 A1* | 10/2012 | Demirci | G01N 1/42 435/2 |
| 2014/0099646 A1* | 4/2014 | Connolly | C12N 1/066 435/6.12 |
| 2015/0375507 A1 | 12/2015 | Ikushima | |
| 2016/0214323 A1* | 7/2016 | Mizes | H04N 1/40 |
| 2016/0288552 A1 | 10/2016 | Ikushima | |

FOREIGN PATENT DOCUMENTS

| | | |
|---|---|---|
| CN | 101678391 | 2/2013 |
| CN | 104965047 | 10/2015 |
| JP | 2003172744 | 6/2003 |
| JP | 2004223471 | 8/2004 |
| JP | 2005040696 | 2/2005 |
| JP | 2008051766 | 3/2008 |
| JP | 2009045541 | 3/2009 |
| JP | 2010045145 | 2/2010 |
| JP | 2013160732 | 8/2013 |

OTHER PUBLICATIONS

"International Preliminary Report on Patentability (Form PCT/IPEA/409) of PCT/JP2016/083148," dated Oct. 17, 2017, with English translation thereof, pp. 1-7.

Ying-Jie Lu et al., "Specific Binding of Integrin alphaIIbbeta3 to RGD Peptide: a Surface Plasmon Resonance Study", with English abstract thereof, Prog. Biochem. Biophys. 2002; 29 ( 5), Oct. 31, 2002, pp. 796-800.

Office Action of China Counterpart Application, with English translation thereof, dated Apr. 20, 2020, pp. 1-18.

* cited by examiner

SOLUTION ATTACHMENT DEVICE AND SOLUTION ATTACHMENT METHOD

CROSS REFERENCE TO RELATED APPLICATION

This is a continuation of International Application No. PCT/JP2016/083148 filed on Nov. 9, 2016, and claims priority from Japanese Patent Application No. 2015-230845 filed on Nov. 26, 2015, the entire disclosures of which are incorporated herein by reference.

BACKGROUND OF THE INVENTION

1. Field of the Invention

The present invention relates to a solution attachment device and a solution attachment method for attaching a solution to a desired region.

2. Description of the Related Art

As a highly sensitive and easy measurement method for determining the amounts of protein, an enzyme, an inorganic compound, and the like included in a subject substance, a fluorescent detection method is widely used. The fluorescent detection method is a method for confirming the presence of a subject substance by detecting fluorescence emitted from a biological specimen considered to include the subject substance which is excited by light having a specific wavelength and emits fluorescent light in the case of being irradiated with excitation light having the specific wavelength. In addition, in a case in which the subject substance is not a fluorescent body, a method in which the presence of a subject substance is confirmed by bringing a substance which is indicated by a fluorescent pigment and is specifically bonded to the subject substance into contact with the biological specimen and then detecting fluorescence in the same manner as described above is also widely used.

In the above-described fluorescent detection method, a surface plasmon resonance sensor device in which an effect of electric field enhancement by plasmon resonance is used in order to improve the detection sensitivity is known. In the surface plasmon resonance sensor device, an inspection kit having a metal film formed on a substrate is used in order to generate plasmon resonance. In addition, excitation light is made incident on the interface between the substrate and the metal film in the inspection kit at an angle that is equal or greater than the total internal reflection angle from a surface side of the substrate opposite to the metal film-formed surface. The radiation of the excitation light generates a surface plasmon in the metal film, fluorescence is enhanced by an electric field enhancement action attributed to the generation of the surface plasmon, and the signal/noise ratio (S/N ratio) improves.

In the inspection kit that is used in the surface plasmon resonance sensor device, a biological specimen that is a measurement subject, that is, a ligand specimen (also including deoxyribonucleic acid (DNA)) is attached onto the metal film formed on the substrate. In addition, there are cases in which a coupling material is attached onto the metal film in advance in order to improve the joining property between the metal film and the ligand specimen.

JP2003-172744A discloses a method for attaching a solution to a metal film in an inspection kit that is used in a surface plasmon resonance sensor device.

JP2009-045541A discloses an application device that is used to manufacture an organic electro luminescence (EL) display device. This application device has a nozzle cleaning device for cleaning a nozzle that ejects a solution downward from an ejection opening.

JP2010-045145A discloses a method for attaching a semiconductor chip onto an electrode by adding a solution including the semiconductor chip onto the electrode dropwise.

JP2004-223471A discloses a device for applying a liquid-phase resin or a liquid of an adhesive or the like to the surface of an electronic component or the like.

SUMMARY OF THE INVENTION

The area of the metal film in the inspection kit that is used in the surface plasmon resonance sensor device is as extremely small as approximately several square millimeters to several tens of square millimeters. In order to attach a solution to all of the above-described small region as a subject, it is effective to increase the amount of the solution to be ejected from an ejection tool.

However, in a case in which the amount (liquid amount) of the solution to be ejected from the ejection tool is too great, in the case of an inspection kit in which a plurality of metal films that serves as the attachment subjects of the solution is present close to one another, individual parts of the solution to be attached to the plurality of metal films are mixed together. In addition, in a case in which the liquid amount is set to be great, it is difficult to highly accurately control the range on the substrate to which the solution is attached. Therefore, the amount of the solution to be ejected from the ejection tool is preferably set to be small.

In order to highly accurately cover the entire metal films with a small liquid amount, it is effective to eject the solution from the ejection tool in a state in which the ejection tool and the metal films are brought to each other as close as possible. Here, in a case in which the size of the bottom surface of the ejection tool is smaller than the size of the metal film, there is a likelihood that, during the ejection of the solution, the solution that has been ejected between the bottom surface of the ejection tool and the metal films may run round to a side surface of the ejection tool and may be attached to the side surface. As a result, there is a likelihood that the solution to be attached to the metal films may decrease and it may become impossible to cover the entire metal films with the solution.

In addition, in a case in which the size of the bottom surface of the ejection tool is smaller than the size of the metal film, and the wettability is not uniform on the metal film surface, there is a likelihood that the solution ejected from the ejection tool may be pulled in a direction toward a highly wettable portion on the metal film surface and it may become impossible to cover the entire metal film with the solution.

Furthermore, in a case in which the size of the bottom surface of the ejection tool is smaller than the size of the metal film, and the wettability is not uniform between the metal film and the substrate on which the metal film is formed, there is a likelihood that the solution ejected from the ejection tool may not sufficiently spread in the boundary surface between the metal film and the substrate and it may become impossible to cover the entire metal film with the solution.

Hitherto, the metal film in the inspection kit that is used in the surface plasmon resonance sensor device has been described as a subject to which the solution is attached.

However, in any techniques which need to cover a predetermined region having an area as small as approximately several square millimeters to several tens of square millimeters with a solution, the above-described problem may be caused.

JP2003-172744A does not consider the attachment accuracy of a solution to the metal film in the inspection kit that is used in the surface plasmon resonance sensor device.

JP2009-045541A and JP2004-223471A do not assume the covering of a predetermined region with the solution and do not consider the attachment accuracy of the solution.

JP2010-045145A does not assume the covering of the entire electrode with the solution and does not consider the attachment accuracy of the solution.

The present invention has been made in consideration of the above-described circumstances, and an object of the present invention is to provide a solution attachment device and a solution attachment method which are capable of highly accurately controlling the attachment range of a solution to a substrate on which a region that becomes the attachment subject of the solution is formed.

A solution attachment device of the present invention comprises an ejection tool having an ejection opening that ejects a solution in a direction of gravitational force and a solution attachment control portion for controlling attachment of the solution ejected from the ejection opening to an attachment subject region of the solution formed on a substrate in a state in which the attachment subject region is disposed below an end surface including the ejection opening of the ejection tool in the direction of gravitational force, and, in the above-described state, a first projection region obtained by projecting the end surface to a surface perpendicular to the direction of gravitational force substantially overlaps a second projection region obtained by projecting the attachment subject region to the surface.

A solution attachment method of the present invention is a solution attachment method for attaching a solution being from an ejection opening of an ejection tool to an attachment subject region of the solution formed on a substrate in a state in which the attachment subject region is disposed below an end surface including the ejection opening in the direction of gravitational force, the ejection opening ejecting the solution in a direction of gravitational force, in which, in the above-described state, a first projection region obtained by projecting the end surface to a surface perpendicular to the direction of gravitational force substantially overlaps a second projection region obtained by projecting the attachment subject region to the surface, and, in the above-described state, a distance between the end surface of the ejection tool and the attachment subject region in the direction of gravitational force is controlled to a first value, the solution being ejected from the ejection opening is brought into contact with the attachment subject region, then, the distance between the end surface of the ejection tool and the attachment subject region in the direction of gravitational force is controlled to a second value that is smaller than the first value, and then the distance between the end surface of the ejection tool and the attachment subject region in the direction of gravitational force is controlled to a third value that is greater than the second value, thereby attaching the solution being ejected from the ejection opening to the attachment subject region.

According to the present invention, it is possible to provide a solution attachment device and a solution attachment method which are capable of highly accurately controlling the attachment range of a solution to a substrate on which a region that becomes the attachment subject of the solution is formed.

EXPLANATION OF REFERENCES

Figure 1:
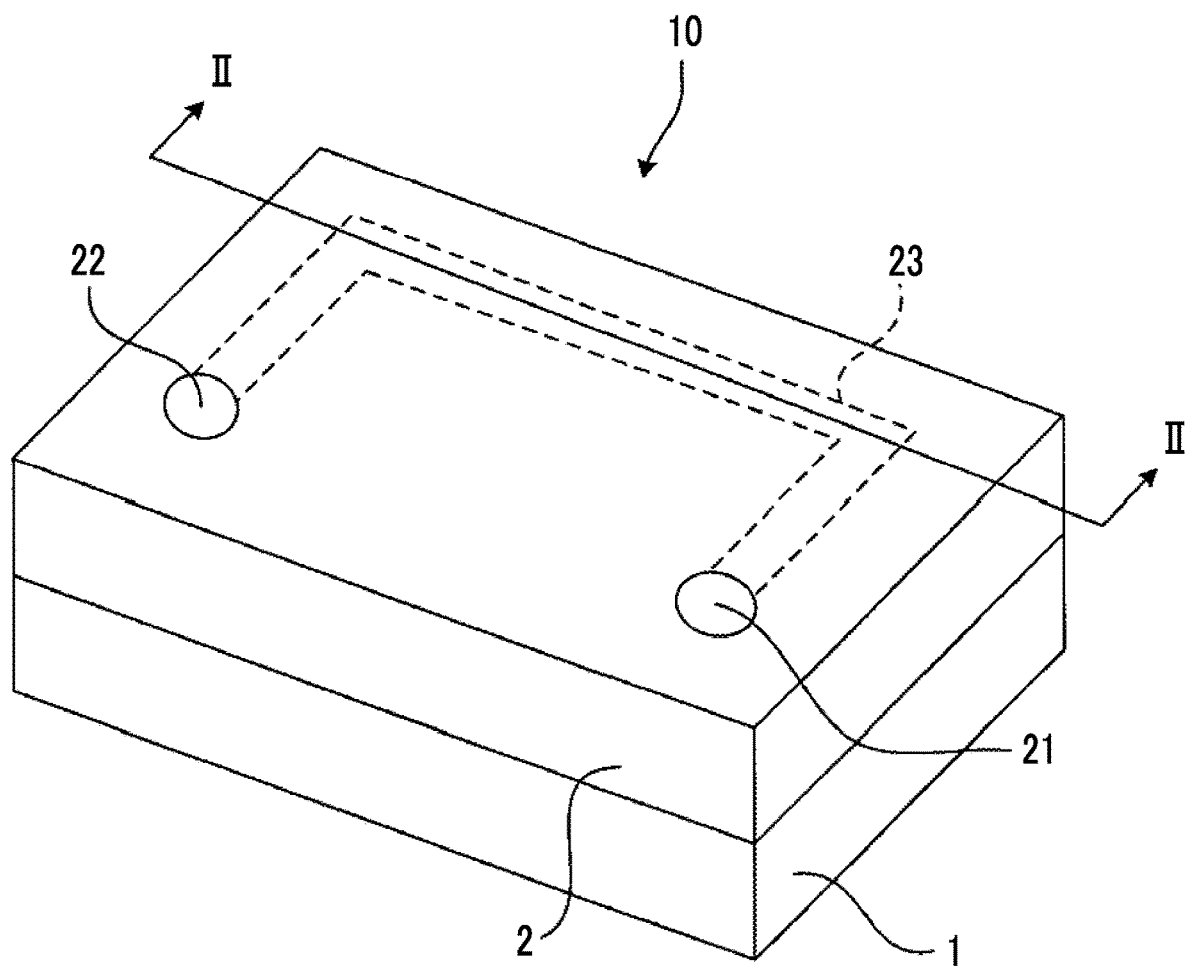
FIG. 1 is a view illustrating a schematic constitution of a subject substance measurement kit 10 which is an embodiment of the present invention.

1: substrate
2: member for forming flow channel
21: inflow hole
22: discharge hole
23: recess portion
10: subject substance measurement kit
11: metal film
M1: bonding substance
La, Lb, Lc: distance
100: solution attachment device
110: stage
120: substrate transportation device
130: ejection unit
130a, 131a: end surface
131aX: first projection region
11X: second projection region
131: ejection tool
131A: ejection opening
132: ejection control portion
140: ejection unit driving device
150: solution attachment control portion
J1: solution

DESCRIPTION OF THE PREFERRED EMBODIMENTS

Hereinafter, an embodiment of the present invention will be described with reference to the drawings.

Figure 2:
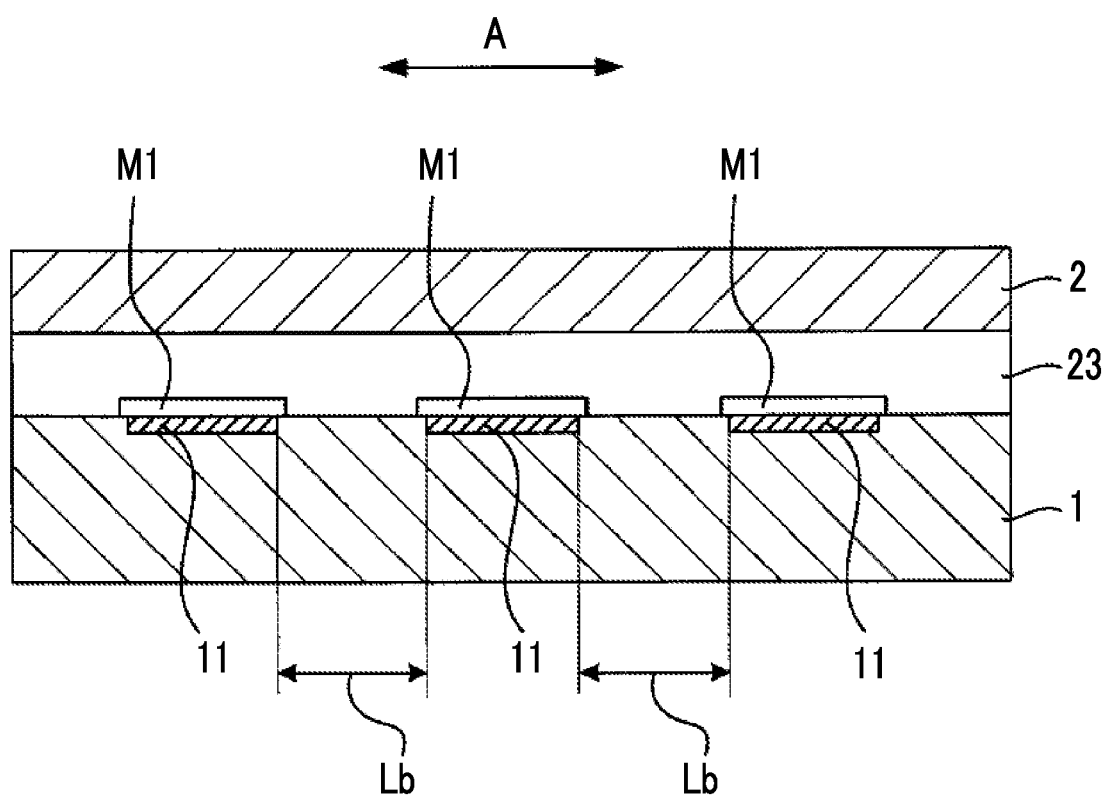
FIG. 2 is a cross-sectional schematic view in a direction of a II-II line illustrated in FIG. 1.

FIG. 1 is a schematic view illustrating a schematic constitution of a subject substance measurement kit 10 which is an embodiment of the present invention. The subject substance measurement kit 10 is a kit for analyzing a biological specimen such as the blood of human beings or animals (detecting a specific subject substance included in a biological specimen) using surface plasmon resonance. FIG. 2 is a cross-sectional schematic view in a direction of a II-II line illustrated in FIG. 1.

The subject substance measurement kit 10 is mainly constituted of a substrate 1 and a member for forming a flow channel 2.

In the member for forming a flow channel 2 in the example of FIG. 1, a recess portion 23 having a bridge-like overall shape is formed on one surface. The member for forming a flow channel 2 is attached to a surface of the substrate 1 on one surface. In addition, as illustrated in FIG. 2, a space surrounded by an inner wall of the recess portion 23 and the substrate 1 forms a flow channel for allowing the flow of a solution including a biological specimen.

In the member for forming a flow channel 2, an inflow hole 21 and a discharge hole 22 which penetrate the member for forming a flow channel from one surface to the other surface are formed. The inflow hole 21 is a portion for allowing the solution including a biological specimen to flow into the flow channel made of the space surrounded by the inner wall of the recess portion 23 and the substrate 1. The discharge hole 22 is a portion for discharging the solution including a biological specimen to the outside from the flow channel. In addition, on a surface of the member for forming a flow channel 2 opposite to the substrate 1, a protrusion portion which is provided so as to surround the inflow hole 21 and the discharge hole 22 and protrudes in the thickness direction of the member for forming a flow channel 2 may be constituted in order to allow the solution to flow in and out from and to the outside.

As illustrated in FIG. 2, in the substrate 1, three metal films 11 are formed and arranged at equal intervals of a distance Lb (corresponding to a second distance) in a direction A which is one direction. Specifically, in a portion on the surface of the substrate 1 in which the flow channel is formed, the three metal films 11 are arranged along the flow channel. The distance in the direction A between two adjacent metal films 11 among the three metal films 11 is the distance Lb.

In the present specification, "being formed on the substrate" means not only a case in which the metal films are arranged so as to be in direct contact with the substrate surface but also a case in which the metal films are formed through other layers without being in direct contact with the substrate.

As the metal film 11, a metal film having a rectangular shape when seen in a direction perpendicular to the surface of the substrate 1 can be used.

As metal constituting the metal film 11, it is possible to use substances allowing the generation of surface plasmon resonance. In order to effectively induce plasmon resonance, as the material of the metal film 11, metal including gold is preferably used, and the entire metal film 11 is more preferably formed of gold. Meanwhile, instead of the metal film 11, a semiconductor film made of silicon or the like can also be used.

To the surface of the metal film 11, a bonding substance M1 having a specific bonding property to the subject substance is fixed. The bonding substance M1 is a substance attached onto the metal film 11 using a solution attachment device 100 described below, and the metal film 11 constitutes an attachment subject region to which the solution is attached.

The amount of the subject substance that is included in the biological specimen bonded to the bonding substance M1 is measured using, for example, a fluorescent detection method by surface plasmon excitation (surface plasmon-enhanced fluorescence (SPF) method). The area of the metal film 11 that is used in the subject substance measurement kit 10 seen in the direction perpendicular to the surface of the substrate 1 is often 5 mm$^2$ or more and 15 mm$^2$ or less, but is not limited to this area.

Figure 3:
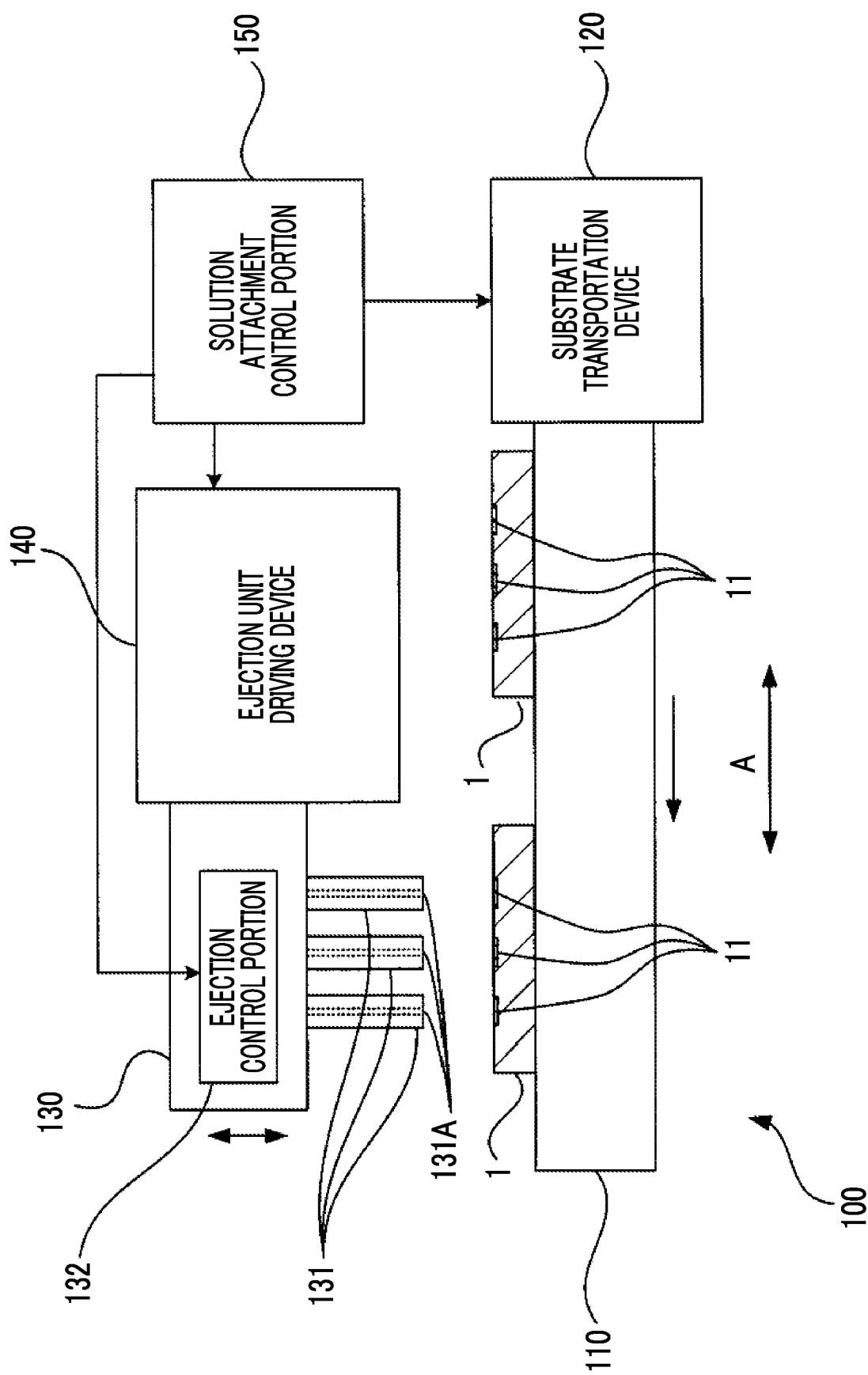
FIG. 3 is a schematic view illustrating a schematic constitution of a solution attachment device 100 which is an embodiment of the present invention.

FIG. 3 is a schematic view illustrating a schematic constitution of the solution attachment device 100 which is an embodiment of the present invention.

The solution attachment device 100 illustrated in FIG. 3 includes a stage 110 on which the substrate 1 of the subject substance measurement kit 10 is placed, a substrate transportation device 120 for transporting the substrate 1 by moving the stage 110, an ejection unit 130 provided with three ejection tools 131 and an ejection control portion 132, an ejection unit driving device 140 for driving the ejection unit 130 in the direction of gravitational force and an opposite direction thereof, and a solution attachment control portion 150 for controlling the substrate transportation device 120, the ejection control portion 132, and the ejection unit driving device 140.

Each of the ejection tools 131 in the ejection unit 130 has an ejection opening 131A that ejects the solution in the direction of gravitational force. An end surface 131a of the ejection tool 131 including the ejection opening 131A and side surfaces of the ejection tool 131 are preferably formed of a material having a high wettability such as stainless steel respectively.

The ejection control portion 132 in the ejection unit 130 ejects a solution that is stored in a solution storage portion, not illustrated, through the ejection openings 131A of the respective ejection tools 131 by a predetermined amount under the control of the solution attachment control portion 150.

The substrate transportation device 120 moves the stage 110 so that the three metal films 11 on an substrate 1 placed on the stage 110 are positioned at positions that the three ejection openings 131A of the ejection tools 131 respectively face under the control of the solution attachment control portion 150.

The ejection control portion 132 ejects the solution from the respective ejection openings 131A and attaches the solution to the metal films 11 in a state in which the metal films 11 on the substrate 1 are positioned at the positions that the three ejection openings 131A of the ejection tools 131 respectively face with the substrate transportation device 120.

The ejection unit driving device 140 moves the ejection unit 130 in the direction of gravitational force and the opposite direction thereof under the control of the solution attachment control portion 150.

Figure 4:
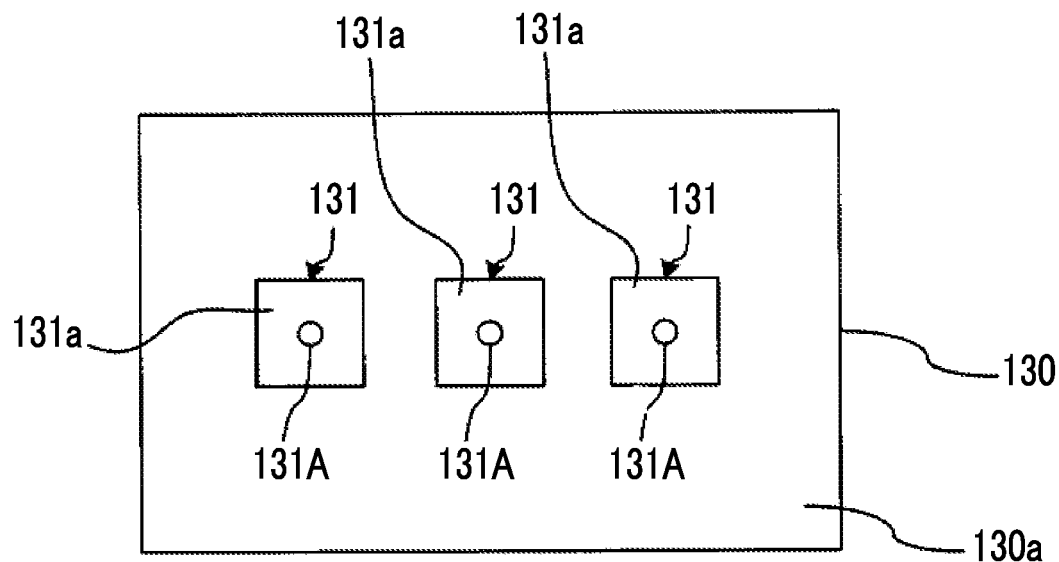
FIG. 4 is a plan view of ejection tools 131 illustrated in FIG. 3 seen in an opposite direction of a direction of gravitational force.

FIG. 4 is a plan view of the ejection tools 131 seen in the opposite direction of the direction of gravitational force.

On an end surface 130a which is a lower portion of the ejection unit 130 in the direction of gravitational force, the three ejection tools 131 protruding in the direction of gravitational force are provided. The three ejection tools 131 are arranged at equal intervals in one direction on the end surface 130a of the ejection unit 130.

As illustrated in FIG. 4, as the ejection tool 131, for example, an ejection tool having a rectangular shape in an end surface 131a including the ejection opening 131A is used. In the center of the end surface 131a of each of the ejection tools 131, the circular ejection opening 131A is formed.

In addition, the arrangement pitch (the distance connecting the centers of the ejection openings 131A) in the arrangement direction of the three ejection tools 131 that are provided in the ejection unit 130 is the same as the arrangement pitch (the distance connecting the centers of the metal films 11) in the arrangement direction (the direction A) of the three metal films 11 formed in the substrate 1.

Figure 5:
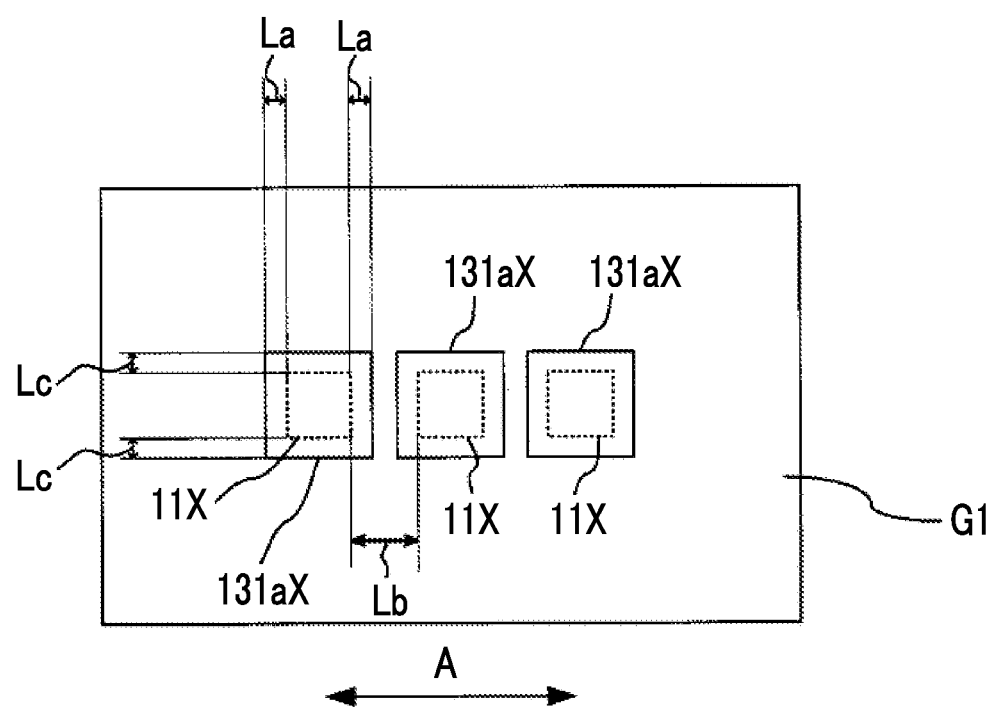
FIG. 5 is a view illustrating a state in which end surfaces 131a of the ejection tools 131 and metal films 11 are projected to a surface G1 perpendicular to the direction of gravitational force in a state in which a substrate 1 is positioned.

FIG. 5 is a view illustrating a state in which the end surfaces 131a of the ejection tools 131 and the metal films 11 are respectively projected to a surface G1 perpendicular to the direction of gravitational force in a state in which the metal films 11 on the substrate 1 are positioned at the positions that the three ejection openings 131A respectively face.

As illustrated in FIG. 5, a first projection region 131aX obtained by projecting the end surfaces 131a of the ejection tools 131 to the surface G1 perpendicular to the direction of gravitational force substantially overlaps a second projection region 11X obtained by projecting the metal films 11 to the surface G1.

In the present specification, "the first projection region 131aX substantially overlaps the second projection region 11X" means that the first projection region 131aX overlaps a region of 97% or more and preferably 99% or more of the second projection region 11X.

In the example of FIG. 5, the first projection region 131aX protrudes to the outside of the second projection region 11X from both ends of the second projection region 11X in the direction A by a distance La (corresponding to a first distance) respectively in the direction A. In addition, the first projection region 131aX protrudes to the outside of the second projection region 11X from both ends of the second projection region 11X in an orthogonal direction that is orthogonal to the direction A by a distance Lc respectively in the orthogonal direction. As described above, in the example of FIG. 5, the first projection region 131aX overlaps a region of 100% of the second projection region 11X.

Hereinafter, the respective constituent elements and the like of the subject substance measurement kit 10 will be described in detail.

(Subject Substance)

The kind of a subject substance that is the detection subject of the subject substance measurement kit 10 is not particularly limited, and examples thereof include cortisol, insulin-like growth factor 1 (IGF-1), insulin-like growth factor binding protein type 3 (IGFBP-3), luteinizing hormone (LH), thyroid stimulating hormone (TSH), anti-resistance hormone (ADH), growth hormone (GH), urinary GH, adrenocorticotropic hormone (ACTH), prolactin, follicle stimulating hormone (FSH), thyroxine binding globulin (TBG), TSH stimulatory receptor antibody (TSAb), thyroxine (T4), antithyroid peroxidase antibody (anti-TPO antibody), microsomal antibody, anti-thyroglobulin antibody, thyroglobulin, triiodothyronine (T3), fT4, fT3, 1,25-(OH)2 vitamin D, type I collagen cross-linked N-telopeptide (NTx), procollagen type I intact N-terminal propeptide (Intact PINP), osteocalcin, calcitonin, bone alkaline phosphatase (BAP), deoxypyridinoline, parathyroid hormone (PTH), Parathyroid hormone-related protein (PTHrP), 5-hydroxyindoleacetic acid (5-HIAA), homovanillic acid (HVA), bile acid, L-dopa, 3-methoxy-4-hydroxyphenylethylene glycol (MHPG), vanillylmandelic acid (VMA), catecholamine, serotonin, metanephrine, 11-deoxycortisol, 17-ketogenic steroid (17-KGS), 17-OH pregnenolone, aldosterone, androsterone, androstenedione, 11-hydroxycorticosteroid (11-OHCS), corticosterone, cortisone, deoxycorticosterone (DOC), dehydroepiandrosterone sulfate (DHEA-S), pregnenolone, 5a dihydrotestosterone, human chorionic gonadotropin (HCG) β subunit, estradiol (E2), estriol (E3), estrogen, estrone (E1), human chorionic gonadotropin (HCG), testosterone, pregnanediol, pregnanetriol, progesterone, C peptide (CPR), vasoactive intestinal peptide (VIP), insulin, gastrin, glucagon, anti-glutamate decarboxylase antibody (anti-GAD antibody), anti-insulinoma antigen-2 antibody (anti-IA-2 antibody), anti-insulinoma antigen, cardiac troponin T, ventricular myosin light-chain I, human heart-type fatty acid-binding protein (H-FABP), human atrial natriuretic peptide (HANP), brain natriuretic peptide (BNP), N-Terminal pro Brain Natriuretic Peptide (NT-proBNP), myoglobin, and the like. A particularly preferred example of the subject substance is TSH.

(Substrate)

As the substrate 1, any substrate may be used as long as the substrate can be used in the fluorescent detection method by surface plasmon excitation. For example, it is possible to use substrates made of a material that is transparent to laser light such as optical glass such as BK7 (borosilicate glass) which is one kind of ordinary optical glass or a synthetic resin, specifically, polymethyl methacrylate, polyethylene terephthalate, polycarbonate, or a cycloolefin polymer. The above-described substrate is, preferably, desirably a material which exhibits no anisotropic property to polarized light and has excellent workability.

(Metal Film)

Preferred examples of metal constituting the metal film 11 include free-electron metal such as gold, silver, copper, aluminum, and platinum. These metals can be used singly or in combination. As the metal film 11, metal including gold is particularly preferred.

The metal film 11 may be formed using an ordinary method and can be formed using, for example, a sputtering method, a vapor deposition method, an ion plating method, an electrodeposition method, a non-electrolytic plating method, or the like. In order to realize favorable adhesion to the substrate 1 which forms the metal film 11, the metal film 11 is preferably formed using a sputtering method. In addition, in consideration of the attachment property to the substrate 1 which forms the metal film 11, an interposition layer made of chromium or the like may be provided between the substrate 1 and the metal film 11.

(Bonding Substance M1)

The bonding substance M1 is not particularly limited as long as the bonding substance is capable of complementing the subject substance, and preferred examples thereof include an antigen, an antibody, and a complex thereof, and an antibody is preferably used. In a case in which the bonding substance M1 is an antibody, as an antibody having a specific property with respect to the subject substance, it is possible to use, for example, an antiserum prepared from a blood serum of an animal immunized using the subject substance, an immune globulin fraction purified from antiserum, a monoclonal antibody obtained by cell fusion in which a spleen cell of an animal immunized using the subject substance is used, a fragment thereof [for example, F(ab')2, Fab, Fab', or Fv], or the like. These antibodies can be prepared using an ordinary method. Furthermore, the antibody may be a modified antibody such as a chimeric antibody, and, additionally, commercially available antibodies prepared from an animal blood serum or a culture supernatant using a well-known method can also be used.

The antibody can be used regardless of the animal species, subclass, and the like thereof. For example, antibodies that can be used in the present invention are antibodies derived from a living organism in which an immune reaction can be caused such as a mouse, a rat, a hamster, a goat, a rabbit, a sheep, a bovine, or a chicken, specifically, a mouse IgG, a mouse IgM, a rat IgG, a rat IgM, a hamster IgG, a hamster IgM, a rabbit IgG, a rabbit IgM, a goat IgG, a goat IgM, a sheep IgG, a sheep IgM, a bovine IgG, a bovine IgM, a chicken IgY, or the like and can be applied to both polyclonal and monoclonal. A fragmented antibody is a molecule which has at least one antigen-bonding portion and is derived from a complete antibody and is, specifically, Fab, F(ab')2, or the like. These fragmented antibodies are molecules obtained using an enzyme, a chemical treatment, or a genetic engineering method.

As a method for fixing the bonding substance such as an antibody or an antigen to particles, it is possible to use, for example, any of the well-known methods which are described in JP2000-206115A, the protocol annexed to FluoSpheres (registered trademark) polystyrene microsphere F8813 of Molecular Probes, Inc., and the like and prepare a reagent for an immune agglutination. In addition, as a principle for fixing an antibody as the bonding substance to particles, it is also possible to employ any of principles regarding chemical bonds by physical adsorption and a covalent bond. As a blocking agent that covers particle surfaces that are not coated with the antibody after the fixation of the antibody to the particles, it is possible to use well-known substances, for example, bovine serum albumin (BSA), skim milk, casein, soybean-derived components, marine components, polyethylene glycol, and the like, commercially available blocking agents for an immune reaction including the above-described substance or a substance having the same property as the above-described substance. On these blocking agents, it is possible to carry out a pretreatment such as partial modification by heat, an acid, an alkali, or the like as necessary.

Hereinafter, a specific example of a solution attachment treatment using the solution attachment device 100 will be described with reference to FIG. 6 to FIG. 11.

In the following description, as the ejection tool 131 in the solution attachment device 100, an ejection tool in which the planar shape of the end surface 131a including the ejection opening 131A is a 3.5 mm×3.5 mm square shape and the planar shape of the ejection opening 131A is a circular shape having a diameter of 1.1 mm is used. In addition, the arrangement pitch of the three ejection tools 131 provided in the ejection unit 130 is 6 mm. In addition, as the ejection tool 131, an ejection tool which is made of stainless steel and has side surfaces coated with polytetrafluoroethylene is used.

In addition, as the solution, an aqueous solution (0.005% by mass) obtained by dissolving bovine serum albumin (BSA) is used. In addition, as the substrate 1 which serves as a subject to which the solution is attached, a substrate on which three metal films which have a 3 mm×3 mm square shape as the planar shape and are made of gold are arranged in one direction and the distance in the arrangement direction between two adjacent metal films in the arrangement direction among the three metal films is 3 mm is used. The setting of the above-described materials or numerical values is an example and is not particularly limited.

Figure 6:
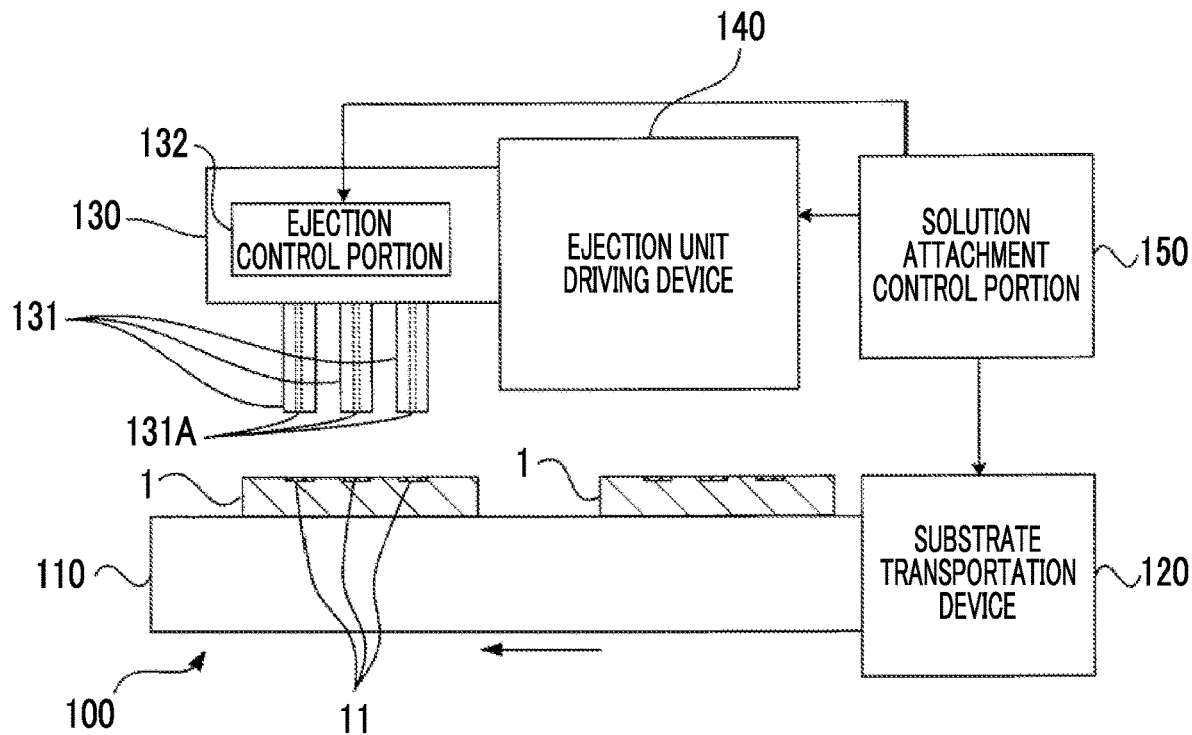
FIG. 6 is a view illustrating a state in which the substrate 1 is positioned in the solution attachment device 100.

First, a plurality of the substrates 1 is mounted on the stage 110 of the solution attachment device 100 using a robot arm or the like not illustrated. In addition, as illustrated in FIG. 6, the solution attachment control portion 150 controls the substrate transportation device 120 so as to drive the stage 110 and positions an substrate 1 so that the metal films 11 on the substrate 1 are positioned at positions that the ejection openings 131A of the ejection tools 131 face.

Meanwhile, here, the substrate is positioned by driving the stage 110 and transporting the substrate 1, but the method for positioning the substrate is not limited thereto. For example, it is also possible to fix the stage 110 and move the ejection unit 130 two-dimensionally in a direction perpendicular to the direction of gravitational force so that the metal films 111 on the substrate 1 come to the positions that the ejection openings 131A of the ejection tools 131 face.

In addition, it is also possible to move the stage 110 and the ejection unit 130 with respect to each other so that the metal films 11 on the substrate 1 come to the positions that the ejection openings 131A of the ejection tools 131 face.

In addition, it is also possible to provide a positioning frame for positioning the substrate on the stage 110 and dispose the substrate 1 in the frame using a human being, a robot arm, or the like, thereby positioning the metal films 11 on the substrate 1 to come to the positions that the ejection openings 131A of the ejection tools 131 face.

With the above-described positioning step, a state illustrated in FIG. 6 in which the metal films 11 that are the attachment subject regions of the solution formed on the substrate 1 are disposed below the end surfaces 131a including the ejection openings 131A of the ejection tools 131 in the direction of gravitational force is obtained. In the state illustrated in FIG. 6, the relationship between the first projection region obtained by projecting the end surfaces 131a to the surface G1 perpendicular to the direction of gravitational force and the second projection region obtained by projecting the metal films 11 to the surface G1 becomes as described in FIG. 5.

Figure 7:
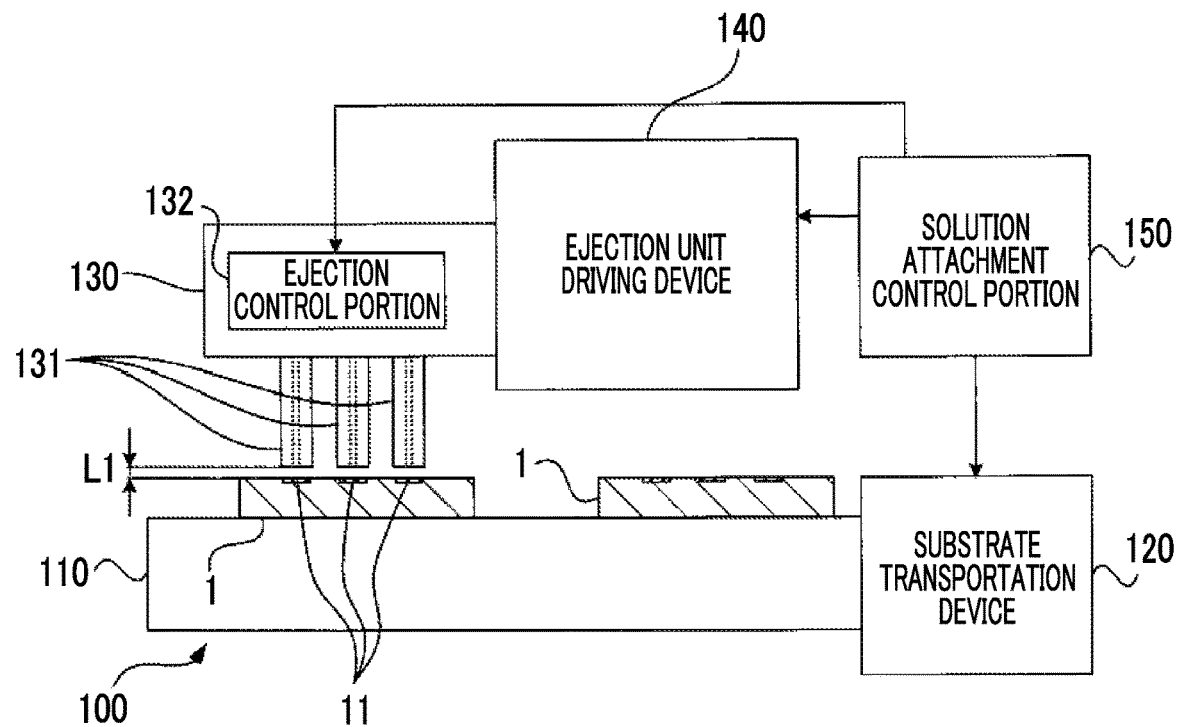
FIG. 7 is a view illustrating an appearance in which an ejection unit 130 is moved in the direction of gravitational force.

After the positioning step, the solution attachment control portion 150 controls the ejection unit driving device 140 so as to move the ejection unit 130 in the direction of gravitational force. In addition, the solution attachment control portion 150 stops the movement of the ejection unit 130 in the direction of gravitational force at a position at which the distance between the metal film 11 surface on the substrate 1 and the end surface 131a of the ejection tool 131 reaches a first value L1 (for example, 1.15 mm) as illustrated in FIG. 7.

Figure 8:
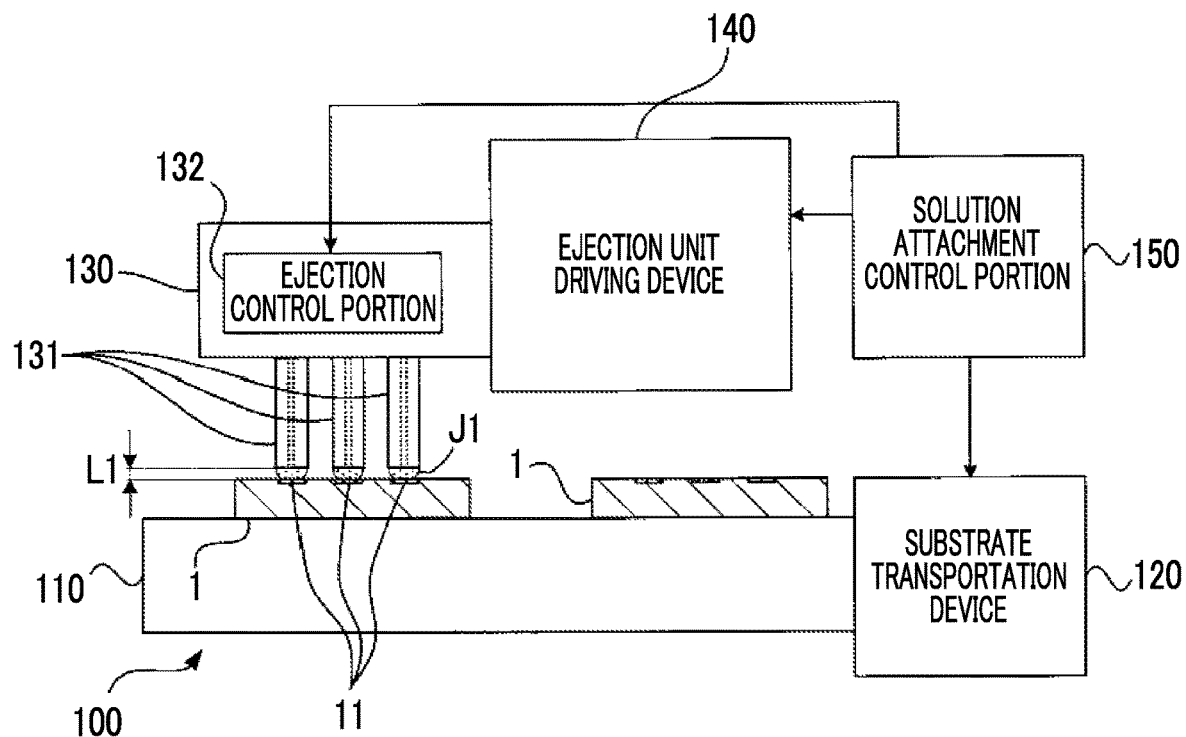
FIG. 8 is a view illustrating an appearance in which a solution is ejected to the metal film 11 on the substrate 1.

Next, the solution attachment control portion 150 controls the ejection control portion 132 so as to eject a predetermined amount (for example, 11.5 µl) of a solution J1 from the ejection openings 131A of the three ejection tools 131 respectively at the same time. FIG. 8 illustrates an appearance in which the solution J1 is ejected from the ejection openings 131A of the three ejection tools 131.

As illustrated in FIG. 8, the solution J1 ejected from the ejection opening 131A spreads throughout the end surface 131a including the ejection opening 131A and, furthermore, hangs down in the direction of gravitational force due to the gravitational force, and thus some of the solution comes into contact with the metal film 11.

After the elapsing of a predetermined time (for example, 0.8 seconds) from the contact of the solution J1 to the metal films 11 as illustrated in FIG. 8, the solution attachment control portion 150 controls the ejection unit driving device 140 so as to move the ejection unit 130 in the direction of gravitational force at a predetermined rate (for example, 30 mm/second) to a position at which the distance between the surface of the metal film 11 on the substrate 1 and the end surface 131a of the ejection tool 131 reaches a second value L2 that is smaller than the first value L1 (for example 0.92 mm).

Figure 9:
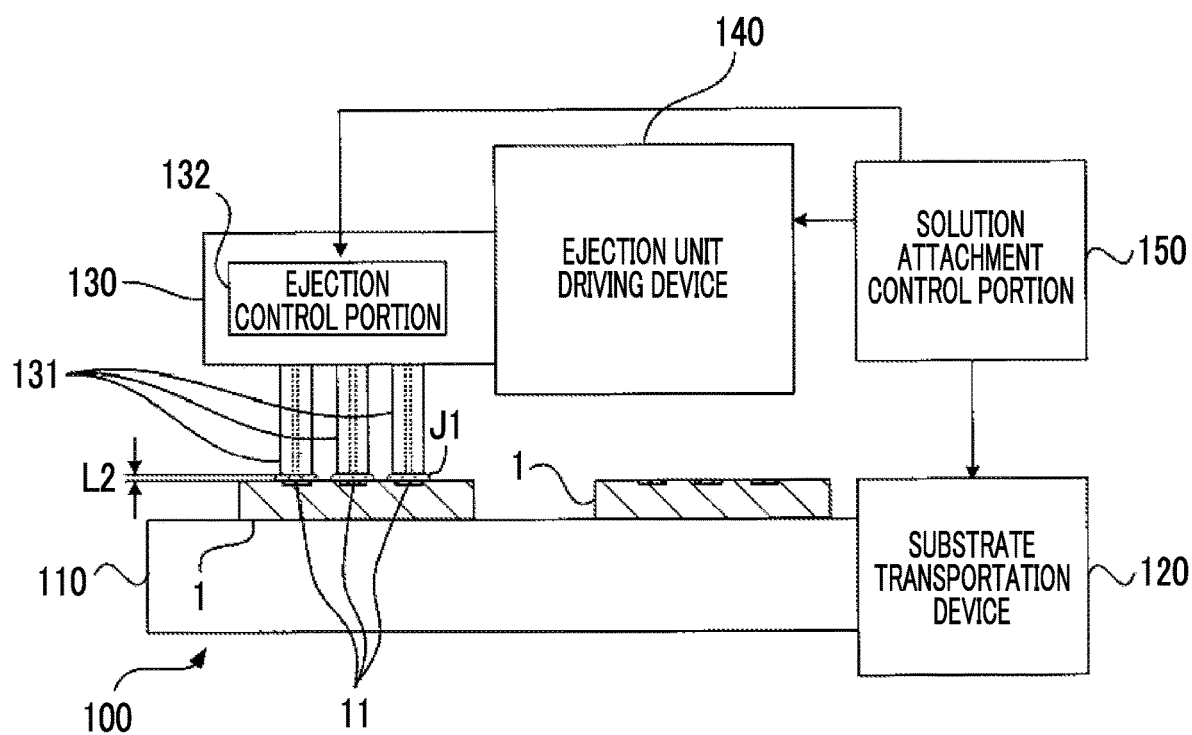
FIG. 9 is a view illustrating an appearance in which the solution brought into contact with the metal film 11 is pressed by the ejection tool 131.

FIG. 9 illustrates a state in which the ejection unit 130 is moved in the direction of gravitational force from the state of FIG. 8 so that the distance between the surface of the metal film 11 on the substrate 1 and the end surface 131a of the ejection tool 131 reaches the second value L2.

After the elapsing of a predetermined time (for example, 1.2 seconds) from the distance between the surface of the metal film 11 on the substrate 1 and the end surface 131a of the ejection tool 131 reaching the second value L2, the solution attachment control portion 150 controls the ejection unit driving device 140 so as to move the ejection unit 130 in the opposite direction of the direction of gravitational force at a predetermined rate (for example, 3 mm/second).

Figure 10:
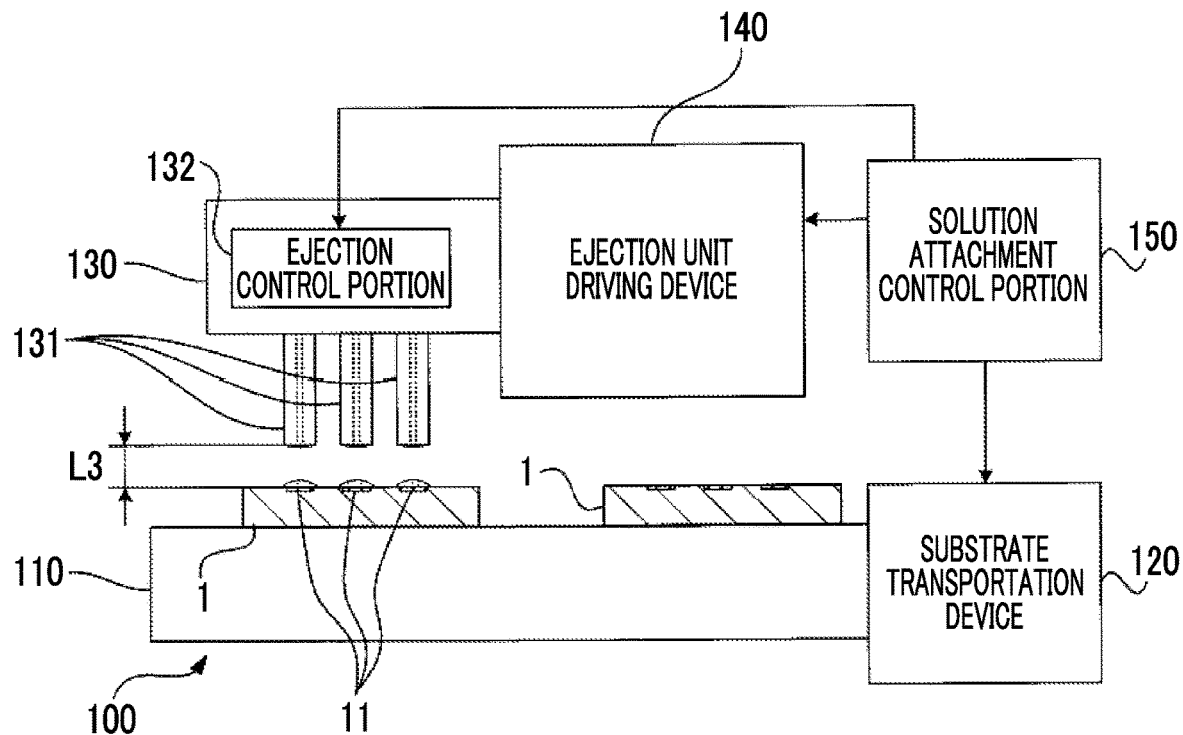
FIG. 10 is a view illustrating an appearance in which the ejection tool 131 pressing the solution is elevated.

In addition, the solution attachment control portion 150 stops the movement of the ejection unit 130 as illustrated in FIG. 10 at a point in time at which the distance between the metal film 11 on the substrate 1 and the end surface 131a of the ejection tool 131 reaches a third value L3 that is greater than the second value L2. The third value L3 needs to be a value great enough to completely separate the solution attached to the metal films 11 and the end surfaces 131a and is set to, for example, a value that is greater than the first value L1.

Meanwhile, the movement rate of the ejection unit 130 in the case of moving the ejection unit 130 from the state of FIG. 9 in the opposite direction of the direction of gravitational force is preferably set to 10 mm/second or less. In a case in which the movement rate is set to 10 mm/second or less, during the separation of the solution present between the metal films 11 and the end surfaces 131a up and down, it is possible to prevent the solution from bouncing and mixing with the solution on the adjacent metal films 11.

Figure 11:
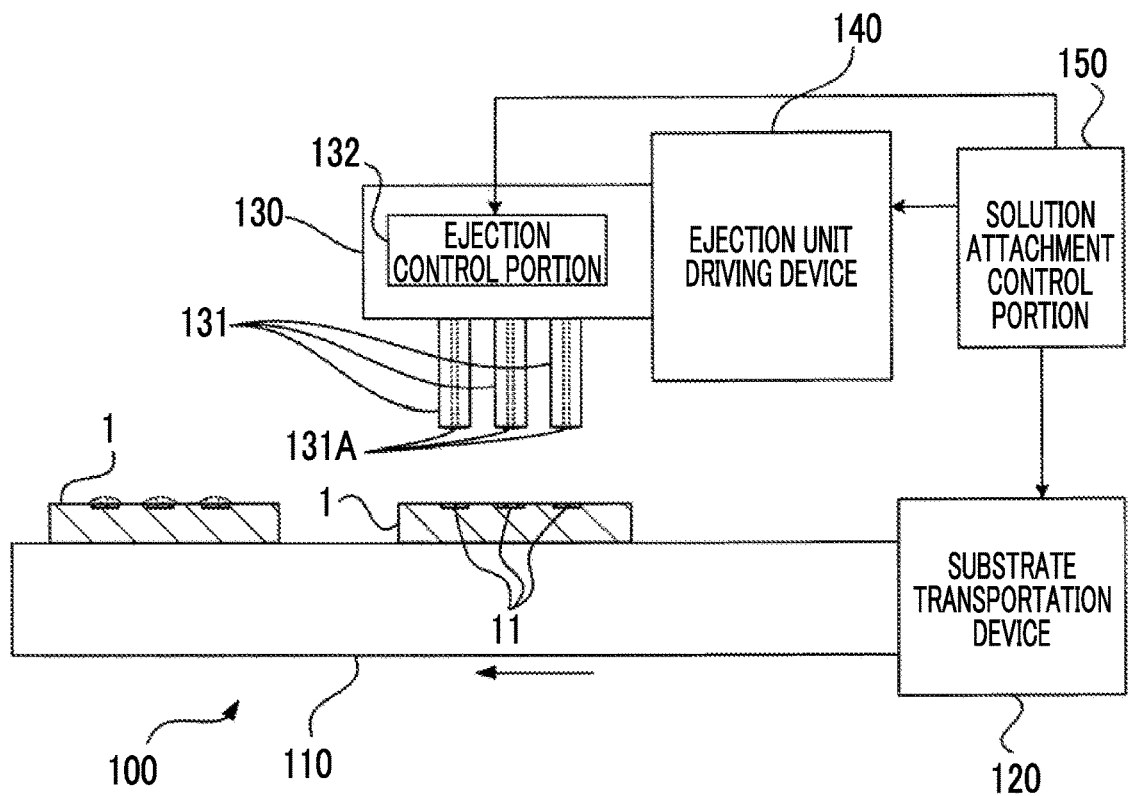
FIG. 11 is a view illustrating an appearance for positioning a substrate 1 to which the solution is attached next in the solution attachment device 100.

Next, the solution attachment control portion 150 controls the substrate transportation device 120 so as to move the stage 110 and position the substrate 1 so that the metal films 11 on the substrate 1 to which the solution is not yet attached come to the positions that the ejection openings 131A of the ejection tools 131 face as illustrated in FIG. 11. After that, the treatments described using FIG. 7 to FIG. 10 are repeated.

As described above, in the solution attachment device 100, the first projection region 131aX substantially overlaps the second projection region 11X in the substrate-positioned state. Therefore, in a case in which the solution is ejected from the ejection openings 131A of the ejection tools 131 in a state in which the metal films 11 and the end surfaces 131a of the ejection tools 131 are sufficiently close to each other as illustrated in FIG. 7, the ejected solution covers the entire metal films 11 in the state of being seen in the direction of gravitational force.

Therefore, in a case in which the ejection unit 130 is moved in the direction of gravitational force from the state of FIG. 8 as illustrated in FIG. 9, it is possible to reliably attach the solution to the entire metal films 11. In addition, in a case in which the first projection region 131aX substantially overlaps the second projection region 11X, the amount of the solution protruding to the outside of the end surfaces 131a of the respective ejection tools 131 in the state of FIG. 9 decreases. As a result, it is possible to prevent the solution from being attached to the side surfaces of the respective ejection tools 131, and it is possible to highly accurately control the liquid amount of the solution to be attached to the metal films 11.

In addition, according to the solution attachment device 100, even in a case in which the wettability is not uniform in the interface between the substrate 1 and the metal films 11, it is possible to cause the solution to easily move beyond the interface by the control of moving the ejection unit 130 in the direction of gravitational force from the state of FIG. 8. Therefore, it is possible to reliably attach the solution to the entire metal films 11.

In addition, according to the solution attachment device 100, in a case in which the first projection region 131aX substantially overlaps the second projection region 11X, it is possible to increase the contact area of the solution in contact with the metal film 11 in a phase in which the solution J1 comes into contact with the metal film 11 for the first time as illustrated in FIG. 8. As described above, since it is possible to attach the solution across a wide region on the surface of the metal film 11 at the same time, even in a case in which the wettability is not uniform on the surface of the metal film 11, it becomes easy to attach the solution to the entire metal film 11.

Meanwhile, the solution attachment control portion 150 may further eject the solution from the ejection openings 131A in the state of FIG. 8, bring the solution J1 into contact with the entire metal films 11, and then move the ejection unit 130 in the opposite direction of the direction of gravitational force, thereby completing the attachment of the solution to the metal films 11.

Even in the above-described case, in a case in which the first projection region 131aX in a positioned state substantially overlaps the second projection region 11X, it is possible to decrease the amount of the solution protruding to the outside of the end surfaces 131a of the respective ejection tools 131 in a state in which the solution is further ejected from the state of FIG. 8. As a result, it is possible to easily prevent the solution from being attached to the side surfaces of the respective ejection tools 131, and it is possible to highly accurately control the liquid amount of the solution to be attached to the metal films 11. In addition, in a case in which the solution is further ejected from the state of FIG. 8, it is possible to cause the solution to move beyond the interface between the substrate 1 and the metal films 11 using the ejecting force of the solution.

In the solution attachment device 100, the distance La (the first distance) and the distance Lc illustrated in FIG. 5 are arbitrarily set respectively as long as the first projection region 131aX substantially overlaps the second projection region 11X. However, in a case in which the unevenness of the positioning accuracy between the ejection tools 131 and the metal films 11, the manufacturing error of the ejection tools 131 or the metal films 11, the positional deviation in the direction perpendicular to the direction of gravitational force during the movement of the ejection unit 130, and the like are taken into account, the distance La (the first distance) is preferably set to be greater than 1/20 of the distance Lb (the second distance) and more preferably set to be greater than 1/10 of the distance Lb. In such a case, it is possible to reliably realize the state in which the first projection region 131aX substantially overlaps the second projection region 11X in the substrate-positioned state.

In addition, in the solution attachment device 100, the distance La (the first distance) illustrated in FIG. 5 is preferably set to be smaller than 1/2 of the distance Lb and more preferably set to be smaller than 1/4 of the distance Lb. In such a case, it is possible to prevent the solution J1 attached to a metal film 11 from mixing with the solution attached to the metal film 11 next to the metal film 11 in the state illustrated in FIG. 9.

In summary, the distance La is preferably set to be greater than 1/20 of the distance Lb and smaller than 1/2 of the distance Lb. In addition, the distance La is more preferably set to be greater than 1/10 of the distance Lb and smaller than 1/4 of the distance Lb.

In addition, in the solution attachment device 100, the amount of the ejection unit 130 moved during the transition from the state of FIG. 8 to the state of FIG. 9 (the value obtained by subtracting the second value L2 from the first value L1) needs to be set to a value great enough to prevent the solution J1 ejected between the ejection tools 131 and the metal films 11 from running round to the side surfaces of the ejection tools 131 and prevent the solution J1 from mixing with the solution ejected from the next ejection tool 131. Specifically, the amount moved is preferably set to a value that is smaller than 0.5 times the first value L1 and more preferably set to a value that is smaller than 0.3 times the first value L1.

In addition, the amount moved needs to be set to a value great enough for the solution J1 attached to the metal films 11 to reliably move beyond the interface between the substrate 1 and the metal films 11 in the state of FIG. 9. Specifically, the amount moved is preferably set to a value that is greater than 0.05 times the first value L1.

In summary, the amount moved is preferably set to a value that is greater than 0.05 times the first value L1 and smaller than 0.5 times the first value L1. In addition, the amount moved is more preferably set to a value that is greater than 0.05 times the first value L1 and smaller than 0.3 times the first value L1.

Hereinafter, a modification example of the solution attachment device 100 will be described.

In the above description, the solution attachment control portion 150 moves the ejection unit 130 in the direction of gravitational force and the opposite direction thereof, thereby controlling the distance between the end surface 131a of the ejection tool 131 and the surface of the metal film 11 in the direction of gravitational force. However, the distance may be controlled by fixing the ejection unit 130 and moving the stage 110 in the direction of gravitational force and the opposite direction thereof. Alternatively, the distance may also be controlled by respectively moving the ejection unit 130 and the stage 110 in the direction of gravitational force and the opposite direction thereof.

In the above description, three metal films 11 are formed on the substrate 1, but the number of the metal films 11 may be one, two, three, four or more. In any cases, as the ejection unit 130, an ejection unit having the same number of ejection tools 131 as the number of the metal films 11 needs to be used.

In the above description, the ejection unit 130 has three ejection tools 131 which is the same number as the number of the metal films 11 formed on the substrate 1, but the number of the ejection tools 131 may be one. In a case in which the ejection unit 130 has one ejection tool 131, the solution is attached to a metal film 11 on a substrate 1 using the method illustrated in FIG. 6 to FIG. 10, then, the substrate 1 is slightly moved, the ejection tool 131 is disposed above the metal film 11 next to the above-described metal film 11, and the solution is attached to the metal film 11 in this state using the method illustrated in FIG. 6 to FIG. 10. The attachment treatment of the solution to one substrate 1 may be carried out by repeating the above-described treatment as many times as the number of the metal films 11 formed on the substrate 1.

The respective shapes of the first projection region 131aX and the second projection region 11X illustrated in FIG. 5 are not limited to the rectangular shape and may be a polygonal shape or a circular shape.

As described above, the present specification discloses the following items.

The disclosed solution attachment device includes an ejection tool having an ejection opening that ejects a solution in a direction of gravitational force and a solution attachment control portion for controlling attachment of the solution ejected from the ejection opening to at least one attachment subject region of the solution formed on a substrate in a state in which the at least one attachment subject region is disposed below an end surface including the ejection opening of the ejection tool in the direction of gravitational force, and, in the above-described state, a first projection region obtained by projecting the end surface to a surface perpendicular to the direction of gravitational force substantially overlaps a second projection region obtained by projecting the at least one attachment subject region to the surface.

In the disclosed solution attachment device, the at least one attachment subject region is a plurality of attachment subject regions formed so as to be arranged on the substrate in one direction, the first projection region and the second projection region respectively have a rectangular shape, the first projection region protrudes to outside of the second projection region from both ends of the second projection region in the one direction by a first distance respectively in the one direction, and the first distance is greater than 1/20 of a second distance between two adjacent attachment subject regions in the one direction among the plurality of attachment subject regions and smaller than 1/2 of the second distance.

In the disclosed solution attachment device, an area of the at least one attachment subject region is 5 mm$^2$ or more and 15 mm$^2$ or less.

In the disclosed solution attachment device, the at least one attachment subject region is formed from metal including gold.

In the disclosed solution attachment device, the solution attachment control portion, in the above-described state, controls a distance between the end surface of the ejection tool and the at least one attachment subject region in the direction of gravitational force to be a first value, brings the solution being ejected from the ejection opening into contact with the at least one attachment subject region, then, controls the distance between the end surface of the ejection tool and the at least one attachment subject region in the direction of gravitational force to be a second value that is smaller than the first value, and then controls the distance between the end surface of the ejection tool and the at least one attachment subject region in the direction of gravitational force to be a third value that is greater than the second value, thereby attaching the solution being ejected from the ejection opening to the at least one attachment subject region.

In the disclosed solution attachment device, a value obtained by subtracting the second value from the first value is greater than 0.05 times the first value and smaller than 0.5 times the first value.

In the disclosed solution attachment device, the substrate is a member for analyzing a biological specimen using surface plasmon resonance.

The disclosed solution attachment method is a solution attachment method for attaching a solution being ejected from an ejection opening of an ejection tool to at least one attachment subject region of the solution formed on a substrate in a state in which the at least one attachment subject region is disposed below an end surface including the ejection opening in the direction of gravitational force, the ejection opening ejecting the solution in a direction of gravitational force, in which, in the above-described state, a first projection region obtained by projecting the end surface to a surface perpendicular to the direction of gravitational force substantially overlaps a second projection region obtained by projecting the at least one attachment subject region to the surface, and, in the above-described state, a distance between the end surface of the ejection tool and the at least one attachment subject region in the direction of gravitational force is controlled to be a first value, the solution being ejected from the ejection opening is brought into contact with the at least one attachment subject region, then, the distance between the end surface of the ejection tool and the at least one attachment subject region in the direction of gravitational force is controlled to be a second value that is smaller than the first value, and then the distance between the end surface of the ejection tool and the at least one attachment subject region in the direction of gravitational force is controlled to be a third value that is greater than the second value, thereby attaching the solution being ejected from the ejection opening to the at least one attachment subject region.

In the disclosed solution attachment method, a value obtained by subtracting the second value from the first value is greater than 0.05 times the first value and smaller than 0.5 times the first value.

In the disclosed solution attachment method, the at least one attachment subject region is a plurality of attachment subject regions formed so as to be arranged on the substrate in one direction, the first projection region and the second projection region respectively have a rectangular shape, the first projection region protrudes to outside of the second projection region from both ends of the second projection region in the one direction by a first distance respectively in the one direction, and the first distance is greater than 1/20 of a second distance between two adjacent attachment subject regions in the one direction among the plurality of attachment subject regions and smaller than 1/2 of the second distance.

In the disclosed solution attachment method, an area of the at least one attachment subject region is 5 mm² or more and 15 mm² or less.

In the disclosed solution attachment method, the at least one attachment subject region is formed from metal including gold.

In the disclosed solution attachment method, the substrate is a member for analyzing a biological specimen using surface plasmon resonance.

According to the present invention, it is possible to provide a solution attachment device and a solution attachment method which are capable of highly accurately controlling the attachment range of a solution to a substrate on which a region that becomes the attachment subject of the solution is formed.

Hitherto, the present invention has been described using the specific embodiment, but the present invention is not limited to this embodiment and can be modified in various manners within the scope of the technical ideas of the disclosed invention.

What is claimed is:

1. A solution attachment device comprising:
    an ejection tool having an ejection opening that ejects a solution in a direction of gravitational force; and
    a solution attachment control portion configured for controlling attachment of the solution ejected from the ejection opening to at least one attachment subject region of the solution formed on a substrate in a state in which the at least one attachment subject region is disposed below an end surface including the ejection opening of the ejection tool in the direction of gravitational force,
    wherein, in the state, a first projection region obtained by projecting the end surface to a surface perpendicular to the direction of gravitational force substantially overlaps a second projection region obtained by projecting the at least one attachment subject region to the surface, and
    the solution attachment control portion, in the state, controls a distance between the end surface of the ejection tool and the at least one attachment subject region in the direction of gravitational force to be a first value, brings the solution being ejected from the ejection opening into contact with the at least one attachment subject region, then, controls the distance between the end surface of the ejection tool and the at least one attachment subject region in the direction of gravitational force to be a second value that is smaller than the first value, and then controls the distance between the end surface of the ejection tool and the at least one attachment subject region in the direction of gravitational force to be a third value that is greater than the second value, thereby attaching the solution being ejected from the ejection opening to the at least one attachment subject region.

2. The solution attachment device according to claim 1, wherein the at least one attachment subject region is a plurality of attachment subject regions formed so as to be arranged on the substrate in one direction,
    the first projection region and the second projection region respectively have a rectangular shape,
    the first projection region protrudes to outside of the second projection region from both ends of the second projection region in the one direction by a first distance respectively in the one direction, and
    the first distance is greater than 1/20 of a second distance between two adjacent attachment subject regions in the one direction among the plurality of attachment subject regions and smaller than 1/2 of the second distance.

3. The solution attachment device according to claim 1, wherein an area of the at least one attachment subject region is 5 mm² or more and 15 mm² or less.

4. The solution attachment device according to claim 2, wherein an area of the at least one attachment subject region is 5 mm² or more and 15 mm² or less.

5. The solution attachment device according to claim 1, wherein the at least one attachment subject region is formed from metal comprising gold.

6. The solution attachment device according to claim 2, wherein the at least one attachment subject region is formed from metal comprising gold.

7. The solution attachment device according to claim 1, wherein a value obtained by subtracting the second value from the first value is greater than 0.05 times the first value and smaller than 0.5 times the first value.

8. The solution attachment device according to claim 2, wherein a value obtained by subtracting the second value from the first value is greater than 0.05 times the first value and smaller than 0.5 times the first value.

9. The solution attachment device according to claim 1, wherein the substrate is a member for analyzing a biological specimen using surface plasmon resonance.

10. The solution attachment device according to claim 2, wherein the substrate is a member for analyzing a biological specimen using surface plasmon resonance.

11. A solution attachment method for attaching a solution being ejected from an ejection opening of an ejection tool to at least one attachment subject region of the solution formed on a substrate in a state in which the at least one attachment subject region is disposed below an end surface including the ejection opening in a direction of gravitational force, the ejection opening ejecting the solution in the direction of gravitational force,
- wherein, in the state, a first projection region obtained by projecting the end surface to a surface perpendicular to the direction of gravitational force substantially overlaps a second projection region obtained by projecting the at least one attachment subject region to the surface, and
- in the state, a distance between the end surface of the ejection tool and the at least one attachment subject region in the direction of gravitational force is controlled to be a first value, the solution being ejected from the ejection opening is brought into contact with the at least one attachment subject region, then, the distance between the end surface of the ejection tool and the at least one attachment subject region in the direction of gravitational force is controlled to be a second value that is smaller than the first value, and then the distance between the end surface of the ejection tool and the at least one attachment subject region in the direction of gravitational force is controlled to be a third value that is greater than the second value, thereby attaching the solution being ejected from the ejection opening to the at least one attachment subject region.

12. The solution attachment method according to claim 11,
- wherein a value obtained by subtracting the second value from the first value is greater than 0.05 times the first value and smaller than 0.5 times the first value.

13. The solution attachment method according to claim 11,
- wherein the at least one attachment subject region is a plurality of attachment subject regions formed so as to be arranged on the substrate in one direction,
- the first projection region and the second projection region respectively have a rectangular shape,
- the first projection region protrudes to outside of the second projection region from both ends of the second projection region in the one direction by a first distance respectively in the one direction, and
- the first distance is greater than $1/20$ of a second distance between two adjacent attachment subject regions in the one direction among the plurality of attachment subject regions and smaller than $1/2$ of the second distance.

14. The solution attachment method according to claim 12,
- wherein the at least one attachment subject region is a plurality of attachment subject regions formed so as to be arranged on the substrate in one direction,
- the first projection region and the second projection region respectively have a rectangular shape,
- the first projection region protrudes to outside of the second projection region from both ends of the second projection region in the one direction by a first distance respectively in the one direction, and
- the first distance is greater than $1/20$ of a second distance between two adjacent attachment subject regions in the one direction among the plurality of attachment subject regions and smaller than $1/2$ of the second distance.

15. The solution attachment method according to claim 11,
- wherein an area of the at least one attachment subject region is 5 mm$^2$ or more and 15 mm$^2$ or less.

16. The solution attachment method according to claim 12,
- wherein an area of the at least one attachment subject region is 5 mm$^2$ or more and 15 mm$^2$ or less.

17. The solution attachment method according to claim 11,
- wherein the at least one attachment subject region is formed from metal comprising gold.

18. The solution attachment method according to claim 12,
- wherein the at least one attachment subject region is formed from metal comprising gold.

19. The solution attachment method according to claim 11,
- wherein the substrate is a member for analyzing a biological specimen using surface plasmon resonance.

20. The solution attachment method according to claim 12,
- wherein the substrate is a member for analyzing a biological specimen using surface plasmon resonance.

* * * * *